UNITED STATES PATENT OFFICE.

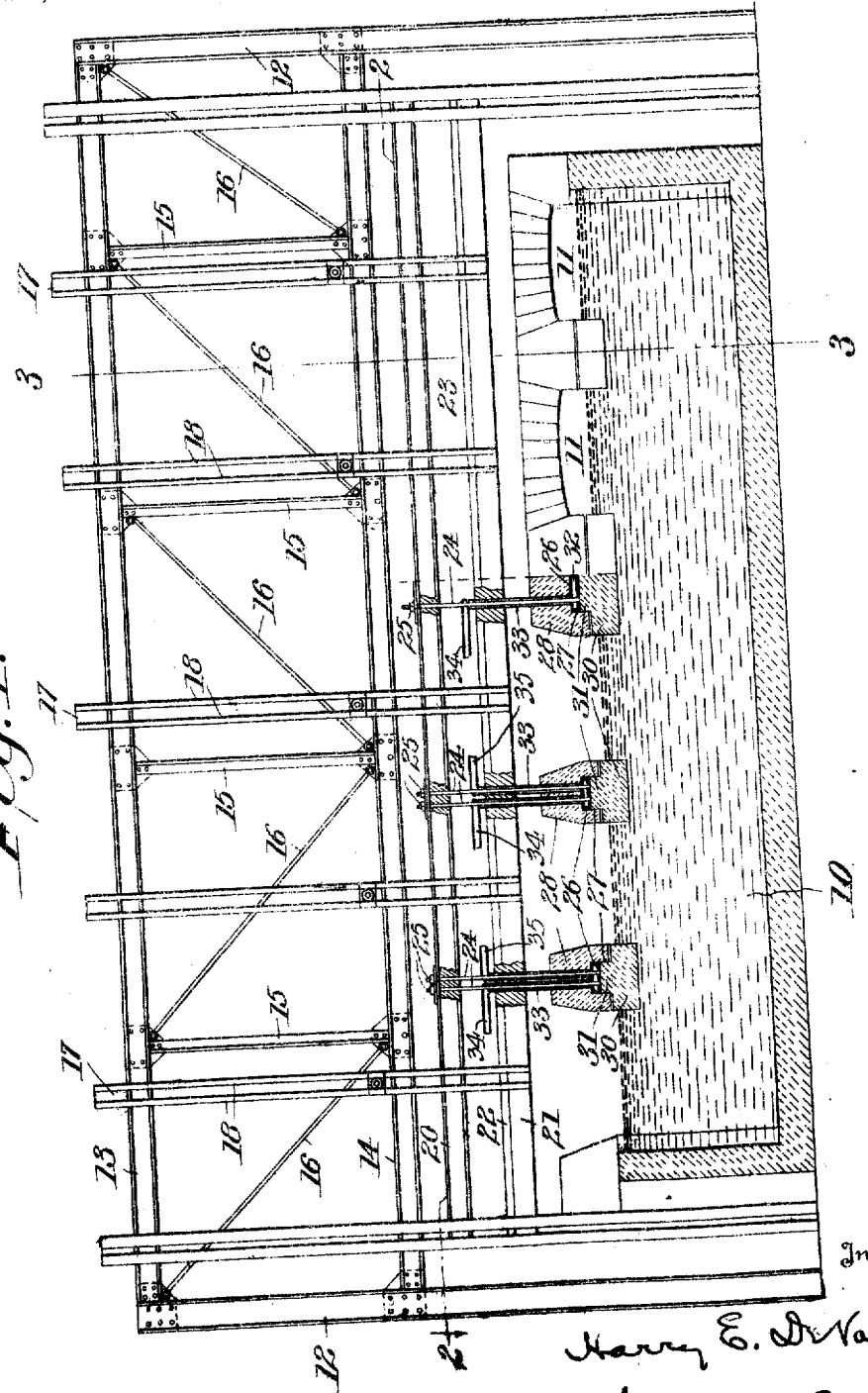

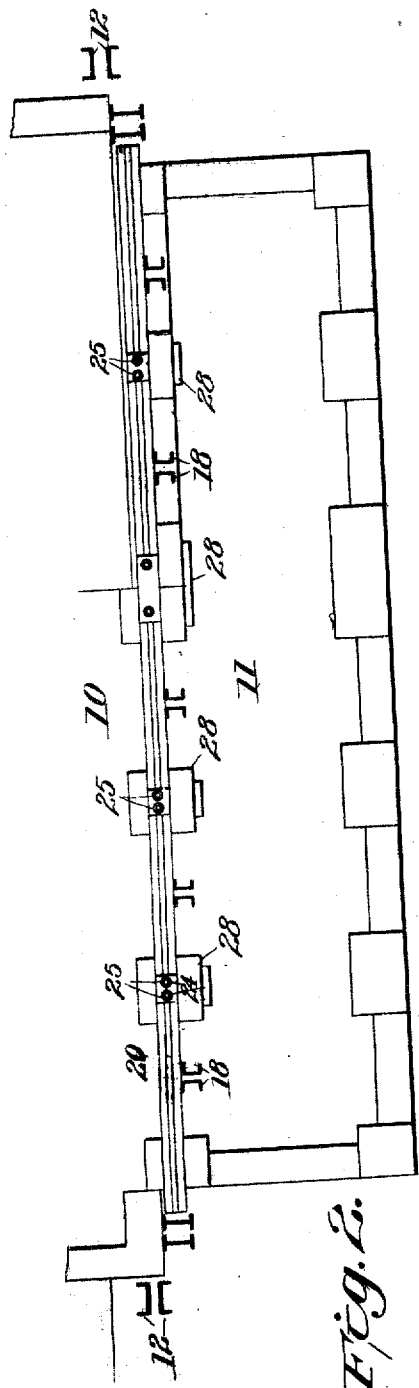

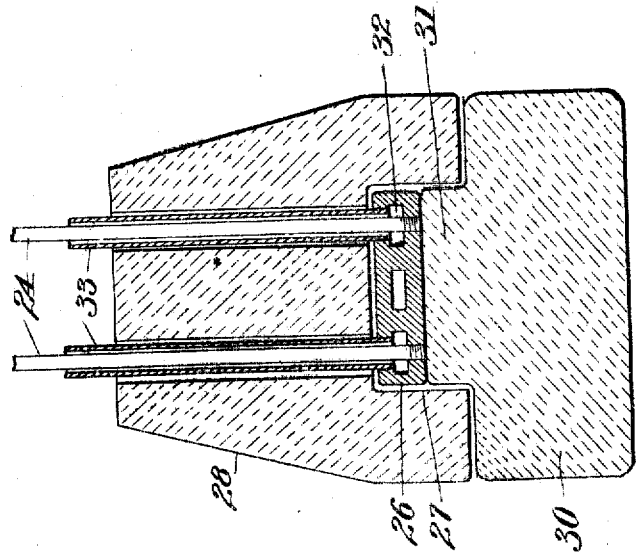
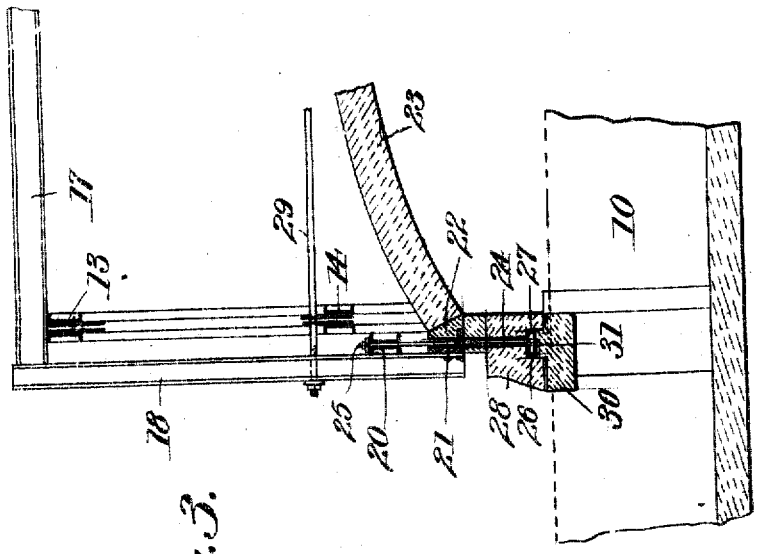

HARRY E. DE VAUGHN, OF MORGANTOWN, WEST VIRGINIA, ASSIGNOR TO WALTER A. JONES, OF MORGANTOWN, WEST VIRGINIA.

GLASS-FURNACE.

1,322,767. Specification of Letters Patent. Patented Nov. 25, 1919.

Application filed October 6, 1916. Serial No. 124,090.

*To all whom it may concern:*

Be it known that I, HARRY E. DE VAUGHN, a citizen of the United States, residing at Morgantown, in the county of Monongalia and State of West Virginia, have invented new and useful Improvements in Glass-Furnaces, of which the following is a specification.

This invention is an improved furnace of the type employed to maintain glass in a molten condition during the usual drawing operations.

It is well known that in the operation of glass furnaces, the piers built up from the bottom of the tank or furnace, or from the walls thereof, to support the cap of the furnace, and to separate the drawing chambers, are frequently destroyed by the molten glass. Aside from the loss entailed by the necessity of discontinuing operation of the furnace, until new piers can be constructed, after the destruction of an old pier, as stated, the quality of the molten glass is also affected by reason of the absorption by the molten metal, of the refractory material of which such piers are usually constructed.

One of the objects of the present invention is to overcome the objections above pointed out, by providing a glass furnace in which the skew blocks and the furnace cap may be suspended over the tank or furnace, and in operative relation thereto. A further object is to provide an improved suspension device for the skew blocks and cap of the furnace. A further object is to protect the suspension devices from the intense heat to which they are normally subjected while in operation.

The invention will be hereinafter fully set forth and particularly pointed out in the claims.

In the accompanying drawings:—

Figure 1 is a sectional view, partly in elevation, illustrating a glass furnace constructed in accordance with the invention. Fig. 2 is a horizontal sectional view on the line 2—2 Fig. 1. Fig. 3 is a vertical sectional view on the line 3—3, Fig. 1. Fig. 4 is an enlarged detail sectional view illustrating a skew block and the suspension device. Fig. 5 is a detail view of the brace struts for carrying and supporting the suspended furnace cap.

Referring to the drawings, 10 designates a tank, the exterior walls of which may be constructed in any well known manner and of any preferred material, said furnace having the drawing chamber 11. Extending over the furnace is a supporting frame comprising the upright bars or beams 12, positioned adjacent the corners of the furnace, and connected by longitudinal beams 13 and 14, secured to the upright beams in any preferred manner, the beams 13 being above the beams 14. The beams 13 and 14 are connected by upright brace beams 15, and also by inclined strut bars 16. By this arrangement it will be readily understood that an exceedingly rigid frame is provided, extending over the top of the furnace, and capable of supporting a very heavy load.

Coöperating with the supporting frame work, above described, is a suspending frame, the same comprising transverse beams 17, resting upon and supported by the beams 13, and having secured thereto depending beams 18, preferably arranged in pairs, said beams 18 being located on both sides of the supporting frame. The beams 17 are connected by strut bars 19. Extending longitudinally of the furnace, and secured to the depending beams 18, are suspension beams 20, and secured to the lower extremities of said depending beams 18, are L-shaped beams 21, which support the heel or skew 22, of the furnace cap 23. Depending from the suspension beams 20, are suspension rods 24, the upper ends of said rods being passed through the beams 20, and maintained in position by means of nuts 25, or any other suitable means. The lower ends of the suspension rods 24 are threaded to engage supporting members 26, shaped to enter a chamber 27 in the underside or bottom of the skew block 28. By means of this arrangement the skew blocks 28, are supported by the rods 24, which in turn are supported by the beam 20 attached to the suspending frame, the heel or skew of the furnace cap being supported by the skew block, thereby maintaining the cap of the furnace in its operative position. The suspending frame is braced at its lower portion, by means of brace rods 29 connecting the bars 19, at opposite sides of the suspending frame.

In practice, piers may be built up in the usual way beneath the skew block, but when the piers are not used it is necessary to protect the supporting members 26 from the intense heat of the molten glass. To accomplish this floating blocks 30 are employed, the same being provided with reduced portions 31, shaped to fit within the recesses 27, of the skew blocks 28, to maintain them in proper position. It will be observed that the skew blocks do not quite reach the level of the molten glass, and as a consequence when the blocks 30 are engaged therewith, said blocks are forced well below the surface of the molten glass.

In order to prevent destruction of the suspension rods 24 and the supporting device 26, it is preferred to make said supporting device hollow by providing the same with an internal chamber 32, and the rods 27 are surrounded by pipes 33 communicating with said chamber, and extending through suitable openings in the skew block, a cooling medium, such as water, being caused to circulate through said pipes 33 and chamber 32. In this manner the rods and the supporting device are protected from destruction by the intense heat, which is too great for metal parts to withstand in the absence of some means to protect them. It will also be noted that the supporting device 26 is further protected by the block 30. Any desired cooling medium may be employed, but for the purpose of illustration the pipes 33 are shown as provided with supply and discharge branches 34 and 35 respectively.

Having thus explained the nature of the invention, and described an operative manner of constructing and using the same, although without attempting to set forth all of the forms in which it may be made, or all of the forms of its use, the following is claimed:—

1. A glass furnace of the character described comprising a supporting frame, suspension beams suspended from said frame, rods suspended from said suspension beams, skew blocks supported by the lower portions of said rods, and a furnace cap suspended by said skew blocks free of said supporting frame.

2. A glass furnace of the character described comprising a supporting frame, suspension beams suspended from said frame, rods suspended from said suspension beams, and a furnace cap suspended by said rods free of said supporting frame.

3. A glass furnace of the character described comprising a supporting frame, suspension beams suspended from said frame, rods suspended from said suspension beams, a furnace cap suspended by said rods free of said supporting frame, and means for protecting said rods from the heat of the furnace.

4. A glass furnace of the character described comprising a supporting frame, a suspending frame supported thereby and having depending portions, suspension beams supported by said depending portions, skew blocks, suspension rods depending from said beams and passed through said skew blocks, whereby the latter are supported in suspension, and a furnace cap supported by said skew blocks.

5. A glass furnace of the character described comprising a supporting frame, suspension beams suspended from said frame, rods suspended from said beams, skew blocks having recesses in their lower sides into which said rods project, attaching devices within said recesses engaging said rods, and a furnace cap suspended by said skew blocks free of said supporting frame.

6. A glass furnace of the character described comprising a supporting frame, suspension beams suspended from said frame, rods suspended from said beams, skew blocks having recesses in their lower sides into which said rods project, attaching devices within said recesses engaging said rods, means for protecting said rods and said attaching devices from the heat of the furnace, and a furnace cap suspended by said skew blocks free of said supporting frame.

7. A glass furnace of the character described comprising a supporting frame, suspension beams suspended from said frame, rods suspended from said beams, skew blocks through which said rods are extended, hollow attaching devices maintaining said rods and skew blocks in engagement, tubes inclosing said rods and communicating with the interiors of said attaching devices, and a furnace cap suspended by said skew blocks free of said supporting frame.

8. A glass furnace of the character described comprising a supporting frame, a suspending frame supported thereby and having depending portions, suspension beams supported by said depending portions, skew blocks suspended from said suspension beams, heel-suspension beams secured to the depending portions of the suspending frame, a heel skew suspended from said heel-suspension beams, and a furnace cap suspended by said skew blocks and heel skew free of said supporting frame.

9. A glass furnace of the character described comprising a supporting frame, a suspending frame supported thereby and provided with depending portions, suspension beams supported by said depending portions, skew blocks suspended from said suspension beams, heel-skew supporting means also suspended from said depending portions, and a furnace cap suspended by said skew blocks and heel-skew free of said supporting frame.

10. A glass furnace of the character described comprising a supporting frame, a suspending frame supported thereby and provided with depending portions, suspension beams supported by said depending portions, skew blocks, means for suspending said skew blocks from said suspension beams, and a furnace cap supported by said skew blocks.

11. A glass furnace of the character described comprising a supporting frame, a suspending frame supported thereby and provided with depending portions, suspension beams supported by said depending portions and attached thereto above the lower ends of the latter, a heel skew beam secured to the lower ends of said depending portions, and a furnace cap suspended from said suspension beam and said heel-skew beam.

12. A glass furnace of the character described comprising a supporting frame, a suspending frame supported thereby and provided with depending portions, an L-shaped heel-skew beam attached to the lower ends of said depending portions, suspension beams attached to said depending portions above the heel-skew beam, a heel-skew supported by said heel-skew beam, skew blocks suspended from said suspension beams, and a furnace cap supported by said skew blocks and heel-skew.

13. An improvement in glass furnaces and the like comprising a tank for the molten glass, skew blocks, means for suspending said skew blocks over the molten glass, and buoyant protector members for said suspending means, said members being capable of floating on the molten glass, said buoyant members and said skew blocks having complemental means for preventing relative displacement.

14. An improvement in glass furnaces and the like comprising a tank for the molten glass, skew blocks, each having a recess in its bottom, means for suspending the skew blocks above the level of the molten glass, and buoyant protector members for said suspending means, said members having reduced portions shaped to enter the recesses in the skew blocks, whereby said buoyant members are held against displacement.

In testimony whereof I have hereunto set my hand in presence of two subscribing witnesses.

HARRY E. DE VAUGHN.

Witnesses:
  A. EDW. HELGREN,
  WM. M. SHEAVLY.